United States Patent
Tsirkin (10) Patent No.: US 10,387,184 B2
(45) Date of Patent: Aug. 20, 2019

(54) ADDRESS BASED HOST PAGE TABLE SELECTION

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 240 days.

(21) Appl. No.: 15/351,653

(22) Filed: Nov. 15, 2016

(65) Prior Publication Data
US 2018/0136867 A1 May 17, 2018

(51) Int. Cl.
*G06F 12/00* (2006.01)
*G06F 13/00* (2006.01)
*G06F 9/455* (2018.01)

(52) U.S. Cl.
CPC ...... *G06F 9/45558* (2013.01); *G06F 9/45545* (2013.01); *G06F 2009/45583* (2013.01); *G06F 2009/45587* (2013.01); *G06F 2009/45591* (2013.01)

(58) Field of Classification Search
USPC .............................. 711/125, 141; 718/1–108
See application file for complete search history.

(56) References Cited

U.S. PATENT DOCUMENTS

| 8,627,414 B1 | 1/2014 | McCune et al. |
| 8,688,920 B2 | 4/2014 | Heller, Jr. |
| 8,930,673 B2 | 1/2015 | Greiner et al. |
| 2013/0074070 A1 | 3/2013 | Warton et al. |
| 2014/0101404 A1 | 4/2014 | Bybell et al. |
| 2014/0173600 A1 | 6/2014 | Ramakrishnan Nair |

OTHER PUBLICATIONS

Landau et al., Advancing the Scalability and Performance of I/O Subsystems in Multicore Platforms, IOLanes, Jan. 1, 2010 (21 pages).
Landau et al., SplitX: Split Guest/Hypervisor Execution on Multi-Core, IBM Research—Haifa, Technion—Israel Institute of Technology, 2011 (7 pages).
Pan et al., Improving Virtualization Security by Splitting Hypervisor into Smaller Components, State Key Laboratory of Information Security, Institute of Information Engineering, Chinese Academy of Sciences, Department of Computer Science, Virginia Commonwealth University, 2012 (16pages).
Dall et al., KVM/ARM: The Design and Implementation of the Linux ARM Hypervisor, Department of Computer Science Columbia University, ASPLOS '14, Mar. 1-4, 2014 (15 pages).

*Primary Examiner* — Sean D Rossiter
(74) *Attorney, Agent, or Firm* — K&L Gates LLP (57) ABSTRACT

A page table selection system includes a memory, a processor in communication with the memory, a virtual machine, and a hypervisor. The virtual machine includes a guest executing on the processor. The hypervisor executes on the processor to grant the guest a first access to a first data structure in a first set of page tables and the second guest a second access to a second data structure in a second set of page tables. A first and second guest address range are executable in the first and second sets of page tables respectively. The hypervisor executes on the processor to detect an execution page fault at an address within the second address range, locate the second set of page tables, and switch to the second set of page tables.

20 Claims, 6 Drawing Sheets

FIG. 1

Set of Page Tables 115A

| | | | 220A |
|---|---|---|---|
| X0001 175A | 260A Read-Only | 280A x03FF000 | |
| X0002 175B | 260B Read-Write | 280B x040F000 | |
| X0003 175C | 260C Executable | 280C x041F000 | |
| X0004 175D | 260D Executable Only | 280D x042F000 | |
| X0005 175E | 260E Inaccessible | 280E x043F000 | |

Rows: 210A, 210B, 210C, 210D, 210E (grouped as 230A)

Set of Page Tables 115B

| | | | 220B |
|---|---|---|---|
| X0010 175F | 260F Read-Only | 280F x01FF000 | |
| X0011 175G | 260G Read-Write | 280G x024F000 | |
| X0012 175H | 260H Executable | 280H x029F000 | |
| X0013 175I | 260I Executable Only | 280I x02EF000 | |
| X0014 175J | 260J Inaccessible | 280J x033F000 | |

Rows: 210F, 210G, 210H, 210I, 210J (grouped as 230B)

ADDRESS BASED HOST PAGE TABLE SELECTION

BACKGROUND

Computer systems may employ virtual machines including one or more guests such as a guest operating system (OS). A virtual machine (VM) is a software implementation of a computer that executes programs in a way similar to a physical machine. The virtual machine may share underlying physical hardware resources between different virtual machines. Each virtual machine may be associated with a physical device, such as a hardware device and/or an assigned device. A virtual machine may perform tasks associated with the functions of physical devices or other resources on the computer system. Page tables may be used to map guest addresses to host physical addresses. The Page table mappings may allow virtual machines to execute parts of the guest while prohibiting execution of other parts of the guest.

SUMMARY

The present disclosure provides new and innovative systems and methods of address based host page table selection. In an example embodiment, a system includes a memory, at least one physical processor in communication with the memory, a virtual machine, and a hypervisor. The virtual machine includes a guest executing on the at least one physical processor. The hypervisor executes on the at least one physical processor to grant the guest a first access to a first data structure in a first set of page tables. A first guest address range is executable in the first set of page tables. The first guest address range corresponds to a first guest function of a plurality of guest functions, and the first guest function is associated with the first data structure. The hypervisor also executes on the at least one physical processor to grant the guest a second access to a second data structure in a second set of page tables. A second guest address range is executable in the second set of page tables. The second guest address range corresponds to a second guest function of the plurality of guest functions, and the second guest function is associated with the second data structure. The hypervisor executes on the at least one physical processor to detect an execution page fault at an address within the second address range, locate the second set of page tables, and switch to the second set of page tables.

In an example embodiment, a method includes granting, by a hypervisor, a guest a first access to a first data structure in a first set of page tables. A first guest address range is executable in the first set of page tables. The first guest address range corresponds to a first guest function of a plurality of guest functions, and the first guest function is associated with the first data structure. Then, the hypervisor grants the guest a second access to a second data structure in a second set of page tables. A second guest address range is executable in the second set of page tables. The second guest address range corresponds to a second guest function of the plurality of guest functions, and the second guest function is associated with the second data structure. The hypervisor detects an execution page fault at an address within the second address range, locates the second set of page tables, and switches to the second set of page tables.

In an example embodiment, a non-transitory machine readable medium stores a program, which when executed by a processor, causes a hypervisor to grant a guest a first access to a first data structure in a first set of page tables. A first guest address range is executable in the first set of page tables. The first guest address range corresponds to a first guest function of a plurality of guest functions, and the first guest function is associated with the first data structure. The non-transitory machine readable medium also causes the hypervisor to grant the guest a second access to a second data structure in a second set of page tables. A second guest address range is executable in the second set of page tables. The second guest address range corresponds to a second guest function of the plurality of guest functions, and the second guest function is associated with the second data structure. Additionally, the non-transitory machine readable medium causes the hypervisor to detect an execution page fault at an address within the second address range, locate the second set of page tables, and switch to the second set of page tables.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing address based host page table selection. Host page table switching may be supported by hardware including various processors (e.g., x86 CPUs) and may allow executing parts of a guest with access to guest addresses. The host page table switching may also prohibit executing other parts of the guest, which improves performance and security for virtual machine guests. For example, access to specific hardware, hypervisor memory, etc. may only be allowed by switching to an alternate set of page tables. In the alternate set of page tables, executable code may not be writeable by the rest of the guest, thereby improving security. For example, the host page table switching may prevent unauthorized execution of code in the system.

Unfortunately, guest code may require modification to execute host page table instructions. Once guest code is modified, the modified guest may be dependent on a specific hypervisor and may be unable to execute on a different physical machine. The guest code's hypervisor dependency and inability to execute on a different physical machine makes it difficult to deploy performance and security solutions for existing guests. For example, once guest code is modified, it becomes difficult to switch between hypervisors since the guest code may be dependent on the original hypervisor. Additionally, guests may be unable to discover which guest functions or vmfunc parameters are allowed by the system (e.g., which parameters are legal). Hard-coding which guest functions are allowed introduces additional maintenance overhead costs, which reduces system performance.

As discussed in the various example embodiments disclosed herein, to improve performance and security, guest code may be split into multiple parts, or guest functions, where each part is loaded at a distinct guest address. For example, by splitting the guest code into multiple parts that are executable in their respective sets of page tables, the guest code does not require further modification to execute page table instructions and therefore is not hypervisor dependent. For example, each part of code or guest function is then granted access to its own data structures in a set of host page tables such that each function has its own set of page tables, where only the guest function code is executable. For example, a scheduler guest function may include code for scheduling tasks, and may need access to task data structures. Additionally, a memory management guest function may include code for managing page tables and page faults. The memory management guest function may need access to page table data structures.

In the event a guest function passes control to another guest function and the guest attempts to execute that code, an execution page fault may occur in the hypervisor. Then, the hypervisor may execute a lookup, and locate host page tables where the requested address is executable. The hypervisor may then switch to the necessary page table. On the other hand, should an unexpected access occur (e.g., scheduler attempting to access guest page tables designated for memory management), the hypervisor may detect a read/write fault and deny access by halting the virtual machine, thereby advantageously improving security of the system by preventing unauthorized access.

Previous techniques included setting up multiple host page tables such that when a guest executes a guest function such as a vmfunc, a CPU may switch to a different set of host page tables. However, the guest is modified whenever it executes and instruction and the code may require a specific layout. For example, an instruction may have to be at the page boundary to ensure that the instruction is executable because the instruction may not work unless it is at the page boundary. However, as discussed in the various example embodiments disclosed herein, the guest does not require modification, but instead causes a jump between page tables, which advantageously prevents the need to modify the guest (modification increases development costs) and may reduce development costs. For example, once an address translation occurs, the CPU may execute the function at the associated address (e.g., jump between page tables) without modifying the guest and therefore advantageously maintaining compatibility between different hypervisors.

Figure 1:
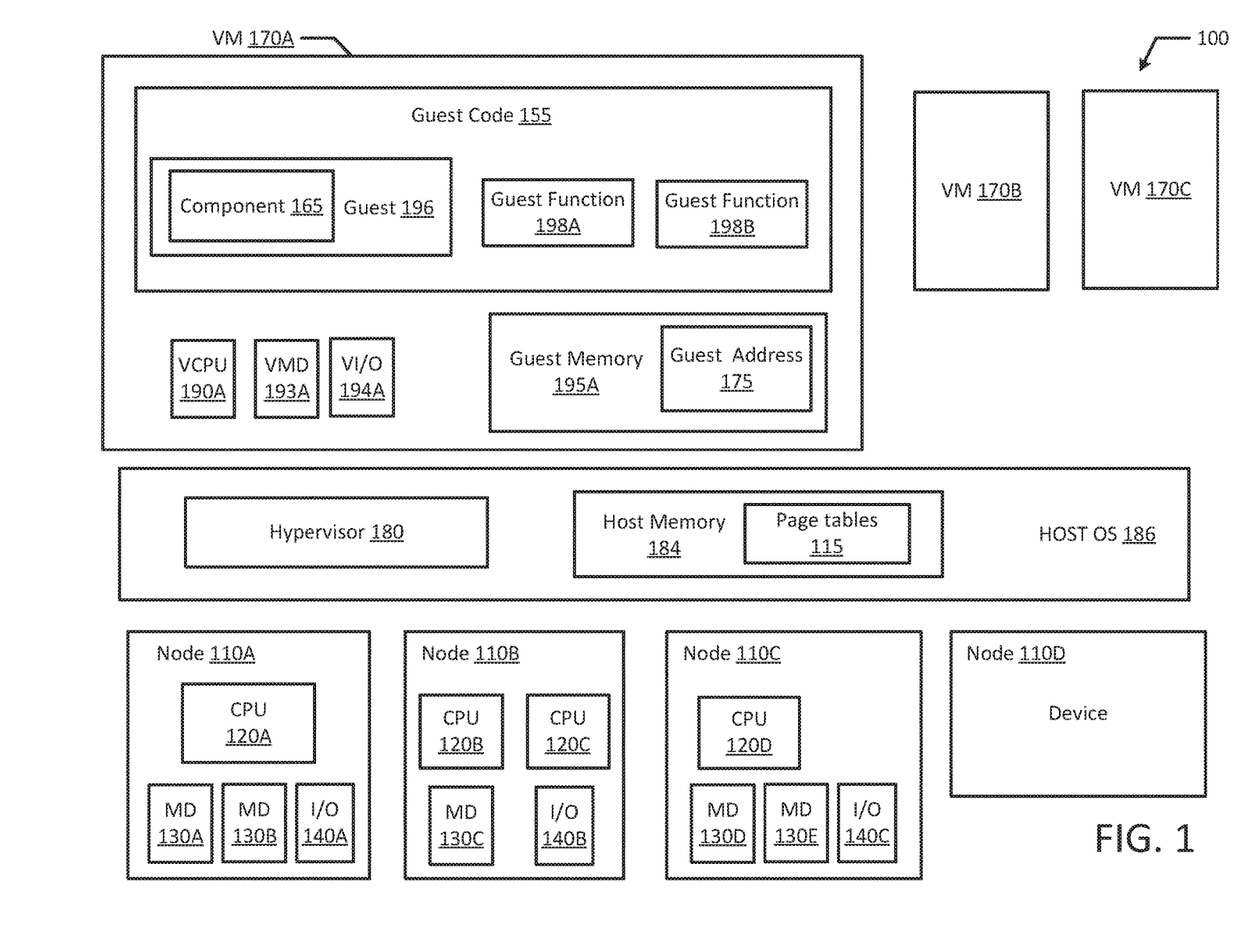
FIG. 1 illustrates a block diagram of an example virtualization computer system according to an example embodiment of the present disclosure.

FIG. 1 depicts a high-level component diagram of an example virtualization computer system 100 in accordance with one or more aspects of the present disclosure. The virtualization computer system 100 may include a memory (e.g., MD 130A-E), at least one physical processor in communication with the memory (e.g., CPU 120A-D), one or more virtual machines (e.g., VM 170A-C), and a hypervisor (e.g., hypervisor 180).

The virtual machines 170A-C may include a guest, guest memory, a virtual CPU, virtual memory devices, and virtual input/output devices. For example, virtual machine 170A may include guest 196, guest memory 195A, a virtual CPU ("VCPU") 190A, a virtual memory device ("VMD") 193A, and virtual input/output device ("VI/O") 194A. In an example, a virtual machine (e.g., VM 170A) may include guest code 155. The guest code 155 may include a plurality of guest functions 198 (e.g., guest function 198A and guest function 198B).

Guest memory (e.g., Guest Memory 195A) may include one or more memory pages. Guest memory may include a plurality of guest addresses 175. Additionally, virtual machine 170A may include a component 165. Component 165 may run within guest 196.

As noted above, virtualization computer system 100 may run multiple virtual machines (e.g., VM 170A-C), by executing a software layer (e.g., hypervisor 180) above the hardware and below the virtual machines 170A-C, as schematically shown in FIG. 1. In an example, the hypervisor 180 may be a component of the host operating system 186 executed by the virtualization computer system 100. In another example, the hypervisor 180 may be provided by an application running on the operating system 186, or may run directly on the virtualization computer system 100 without an operating system beneath it. The hypervisor 180 may virtualize the physical layer, including processors, memory, and I/O devices, and present this virtualization to virtual machines 170A-C as devices, including virtual processors (e.g., VCPU 190A), virtual memory devices (e.g., VMD 193A), and/or virtual I/O devices (e.g., VI/O 194A). Also, similar to illustrated VM 170A, each of VM 170B and/or VM 170C may include one or more VCPUs, VMDs, and/or VI/O devices.

The hypervisor 180 may manage host memory 184 for the host operating system 186 as well as memory allocated to the virtual machines 170A-C and guest operating systems 196 such as guest memory 195A provided to guest 196. Host memory 184 and guest memory 195A may be divided into a plurality of memory pages that are managed by the hypervisor 180. Guest memory 195A allocated to the guest 196 may be mapped from host memory 184 such that when a guest application uses or accesses a memory page of guest memory 195A it is actually using or accessing host memory 184.

The virtualization computer system 100 may include one or more interconnected nodes 110A-C. Each node 110A-C may in turn include one or more physical processors (e.g., CPU 120A-D) communicatively coupled to memory devices (e.g., MD 130A-E) and input/output devices (e.g., I/O 140A-C). Node 110D may include a device such as an assigned device or a hardware device. In an example, a hardware device and/or an assigned device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, a physical processor or a processor 120A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. Also, as discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node and/or between nodes, including the connections between a processor 120A-D and a memory device 130A-E and between a processor 120A-D and an I/O device 140A-C, may be provided by one or more local buses of suitable architecture, for example, peripheral component interconnect (PCI).

The host OS 186 may also include one or more page tables 115. In an example, the page tables may be extended page tables, translating guest addresses to host addresses. For example, the page tables may translate guest physical addresses to host physical addresses. In another example, the page tables may translate guest virtual addresses to host physical addresses. In yet another example, the page tables may translate guest physical addresses to hypervisor virtual addresses. Examples of these data structures are described in greater detail below and as shown in FIG. 2.

Figure 2:
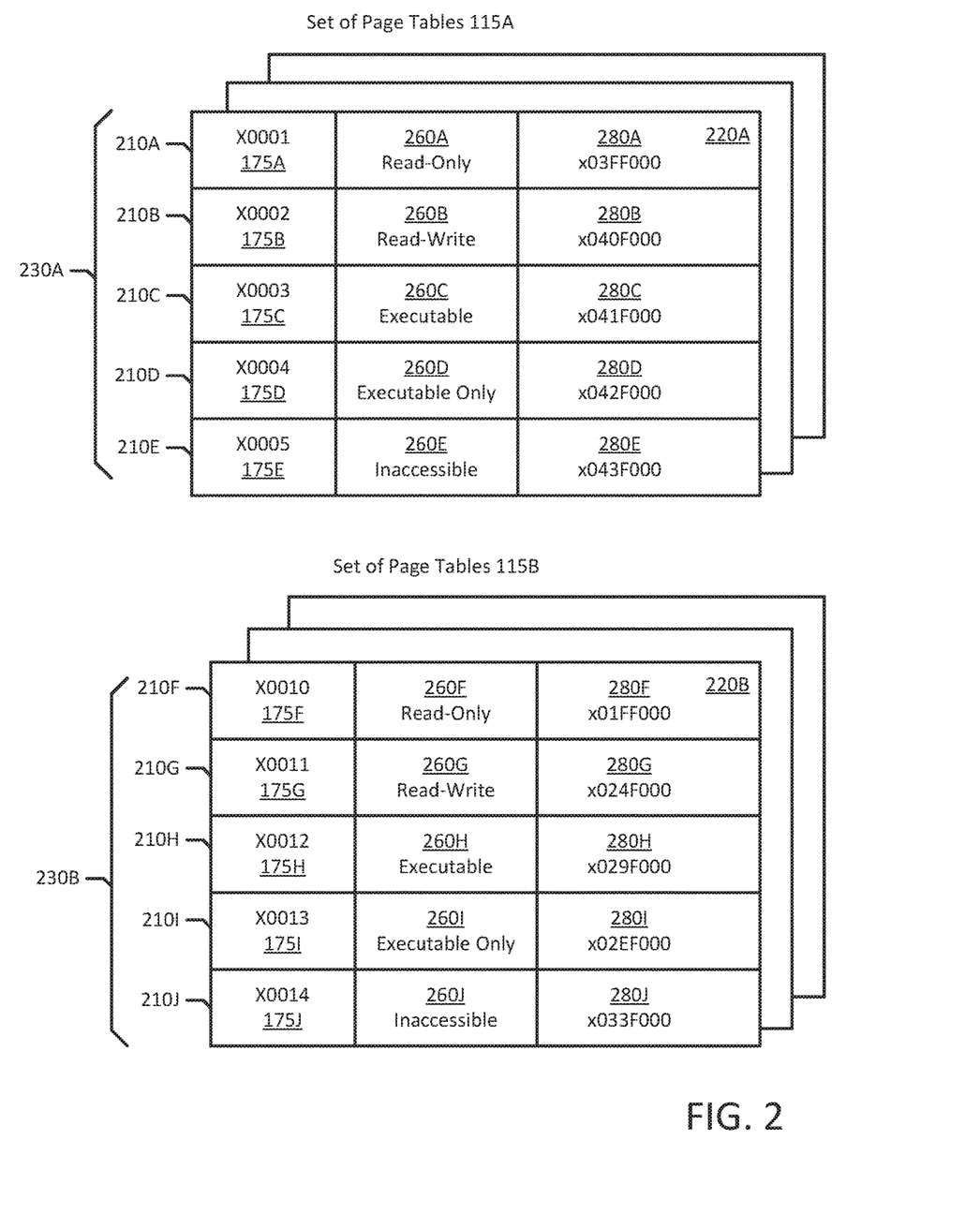
FIG. 2 illustrates page tables used with an example virtualization computer system according to an example embodiment of the present disclosure.

FIG. 2 illustrates a first set of page tables 115A and a second set of page tables 115B according to an example of the present disclosure. In general, the hypervisor 180 may manage the memory usage of the VMs 170A-C. Both virtual memory and physical memory may be divided into pages which are identified with a unique number (e.g., Page Frame Number (PFN) 210A-J).

The first set of page tables 115A and second set of page tables 115B (hereinafter generally referred to as page tables 115) are data structures used by the hypervisor 180 to store a mapping of addresses of the guest 196 to addresses of the host OS 186 (e.g., physical resources of the computer system 100). Accordingly, address translation is handled using the page tables 115. For example, a guest 196 operating within the VMs (e.g., VM 170A) may be given the impression that there is a contiguous section of guest memory 195A available, when in reality, the available guest memory 195A may be spread across various memory devices 130A-D.

A page table 115 includes entries that map PFN 210A-J, for example an address of the guest 196, with an address 280A-J, for example an address of the host OS 186. Page tables 115 may be used together with any paging data structure used by the VMs 170A-C to support translation from guest 196 to host OS 186 addresses (e.g., 32-bit linear address space using a two-level hierarchical paging structure, Physical Address Extension mode, INTEL Extended Memory 64 Technology mode, etc.). In an example, a first guest address range 230A may be executable in the first set of page tables 115A. Additionally, the first guest address range 230A may correspond to a first guest function 198A.

The first guest function 198A may be associated with a first data structure 220A. For example, the first guest function 198A may be a scheduler guest function that includes code for scheduling tasks and the first data structure 220A may be a task data structure. Similarly, a second guest address range 230B may be executable in the second set of page tables 115B. Additionally, the second guest address range 230B may correspond to a second guest function 198B. The second guest function 198B may be associated with a second data structure 220B. For example, the second guest function 198B may be a memory management guest function that includes code for managing memory and the second data structure 220B may be a page table data structure.

In an example, page tables 115 may also include an access status parameter 220A-J. The access status parameter 260A-J indicates an access status for each of the pages. An access status may be used to define, for example, that a given page is writable (or read-write), write-protected (or read-only), executable (or executable and readable), executable only, inaccessible (or non-present), etc. For example, in FIG. 2, the page associated with virtual PFN x0001 and memory location x03FF000 has been defined as 'Read-Only'. The page associated with virtual PFN x0011 and memory location x024F000 in has been defined as 'Read-Write'. The hypervisor 180 may be used to modify an access status parameter 260A-J. In addition, in an example, page tables 115 may include additional information not shown in FIG. 2 including statistics information, background information, etc.

In an example, page tables 115 may be maintained by the hypervisor 180 which map guest 196 addresses to host OS 186 addresses that are accessible by the hypervisor 180, VMs 170A-C, guest 196, host OS 186, host OS 186 resources, and/or Guest Functions 198A-B. The sizes of different page tables may vary and may include more or fewer entries than are illustrated in FIG. 2. In an example, a set of page tables may include a single page table or data structure.

Figure 3:
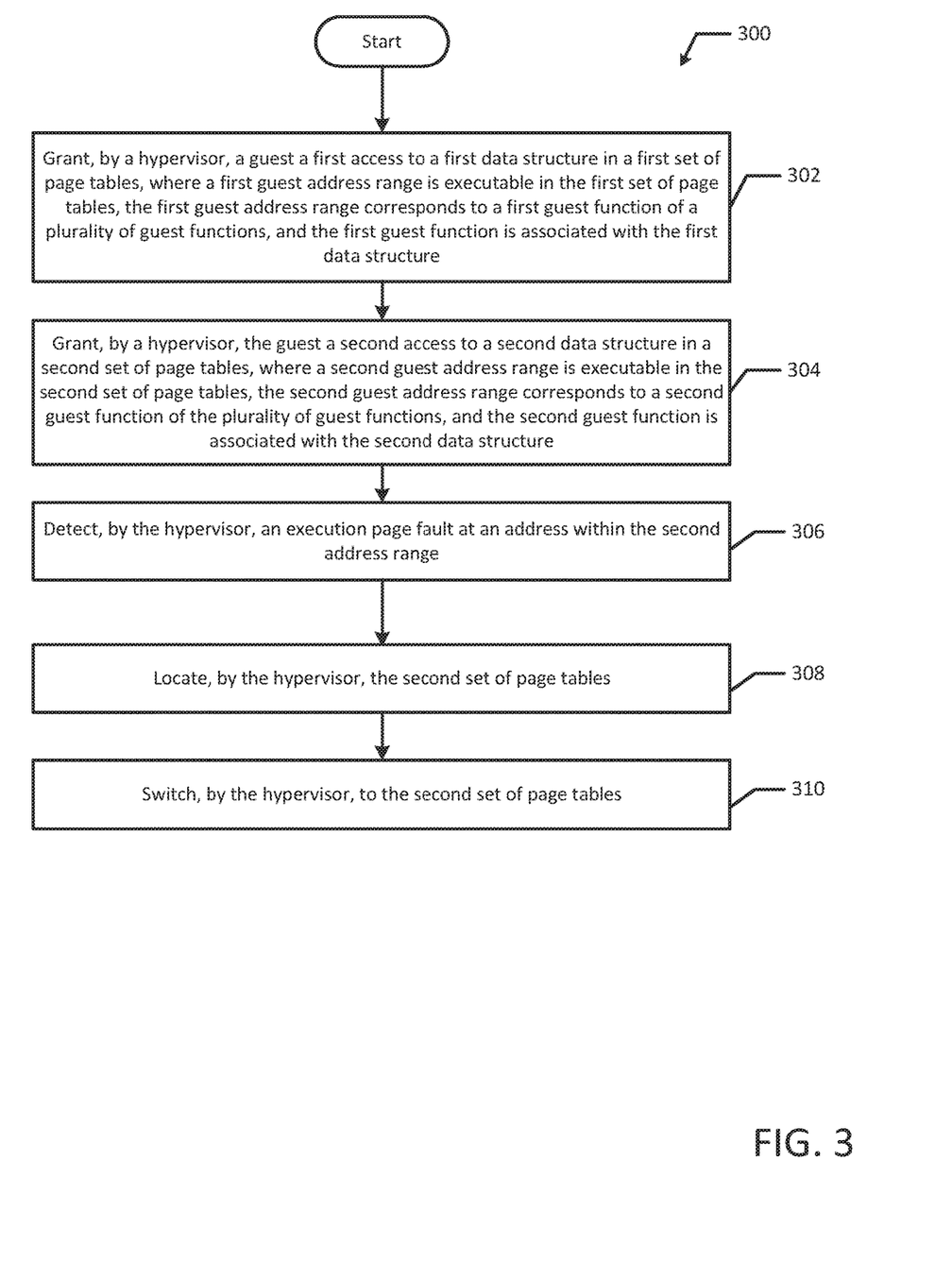
FIG. 3 illustrates a flowchart of an example process for address based host page table selection according to an example embodiment of the present disclosure.

FIG. 3 illustrates a flowchart of an example method 300 for page table selection in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

The example method 300 includes granting, by a hypervisor, a guest a first access to a first data structure in a first set of page tables, where a first guest address range is executable in the first set of page tables, the first guest address range corresponds to a first guest function of a plurality of guest functions, and the first guest function is associated with the first data structure (block 302). For example, a hypervisor 180 may grant a guest 196 a first access to a first data structure 220A in a first set of page tables 210. The first guest address range 230A may correspond to a first guest function 198A of a plurality of guest functions 198. In an example, the first guest function 198A may be associated with the first data structure 220A. In an example, the first guest function 198A may be a scheduler guest function associated with a first data structure 220A such as a task data structure.

Then, the hypervisor grants the guest a second access to a second data structure in a second set of page tables, where a second guest address range corresponds to a second guest function of the plurality of guest functions, and the second guest function is associated with the second data structure (block 304). For example, hypervisor 180 may grant the guest 196 a second access to a second data structure 220B in a second set of page tables 115B. The second guest address range 230B may correspond to a second guest function 198B of the plurality of guest functions 198. In an example, the second guest function 198B may be associated with the second data structure 220B. In an example, the second guest function 198B may be a memory management guest function associated with a second data structure 220B, such as a page table data structure.

The hypervisor detects an execution page fault at an address within the second address range (block 306). For example, the hypervisor 180 may detect an execution page fault at an address 175 (e.g., Address 175G "x0012") within the second address range 230B. Then, the hypervisor locates the second set of page tables (block 308). For example, the hypervisor 180 may locate the second set of page tables 115B. In an example, the hypervisor may locate the second set of page tables 115B by executing a lookup. Also, the hypervisor switches to the second set of page tables (block 310). For example, the hypervisor 180 may switch to the second set of page tables 115B where the second guest address range 230B is executable. In an example, the hypervisor 180 may switch to the second set of page tables 115B by creating the second set of page tables 115B. In another example, the hypervisor may maintain the first set of page tables 115A and the second set of page tables 115B concurrently.

Figure 4A:
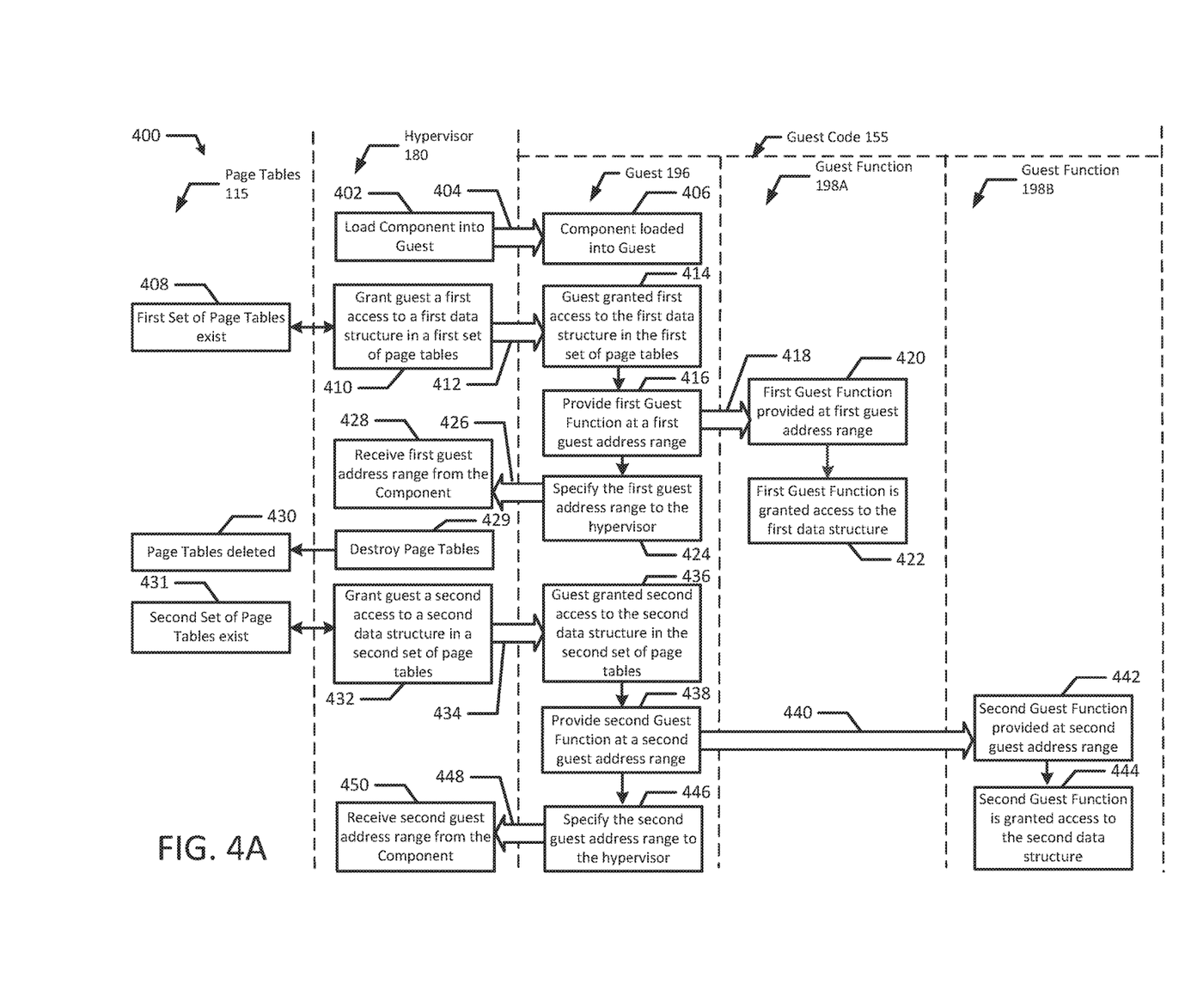
FIGS. 4A and 4B illustrate a flow diagram of an example process for address based host page table selection according to an example embodiment of the present disclosure.
Figure 4B:
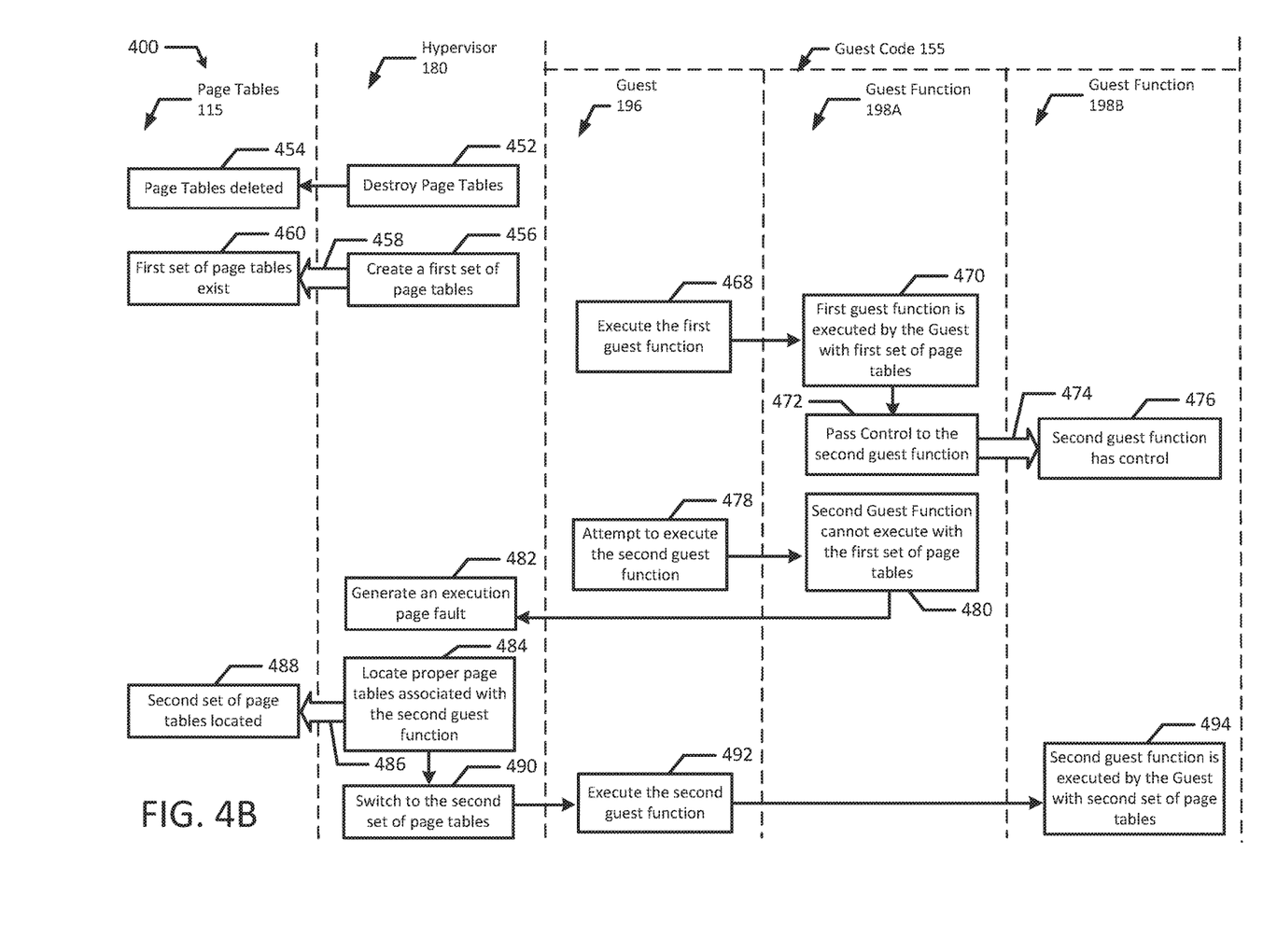

FIGS. 4A and 4B depict a flow diagram illustrating an example method 400 for page table selection according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both.

In the illustrated example, a hypervisor 180 may load a component 165 into a guest 196 (blocks 402 and 404). In an example, the component 165 may be loaded into the guest 196 during guest initialization. Then, within the guest code 155, the component 165 is loaded into the guest 196 (block 406). In an example, the component 165 may be responsible for setting up guest functions (e.g., guest function 198A-B). Additionally, a first set of page tables 115A may exist (block 408). For example, the first set of page tables 115A may have previously been created and/or maintained by the hypervisor 180. The hypervisor 180 may grant the guest 196 a first access to a first data structure 220A in the first set of page tables 115A (blocks 410 and 412). In an example, the hypervisor 180 may grant the component 165 a first access to the first data structure 220A in the first set of page tables 115A. For example, the first set of page tables 115A may include task data structures. Then, the guest 196 is granted access to the first data structure 220A in the first set of page tables 115A (block 414). For example, the first data structure 220A may be a task data structure that is used with scheduler guest functions.

The guest 196 may provide a first guest function 198A at a first guest address range 230A (blocks 416 and 418). For example, the guest 196 may provide a scheduler guest function at an address range between guest addresses 175A-E (e.g., x0001 to x0005). The first guest function 198A may be provided at a first guest address range 230A (block 420). As described above, the first guest function 198A may be a scheduler guest function. In another example, the first guest function 198A may be a different function that performs other system tasks. The first guest function 198A may be granted access to the first data structure 220A (block 422). For example, a scheduler guest function may be granted access to a task data structure to enable the scheduler guest function to schedule tasks for the system. The guest 196 may specify the first guest address range 230A to the hypervisor 180 (blocks 424 and 426). For example, the guest 196 may enlist component 165 to specify the first guest address range 230A to the hypervisor 180. Then, the hypervisor 180 may receive the first guest address range 230A from the component 165 (block 428).

The hypervisor 180 may destroy the first set of page table 115A (block 429). Accordingly, the first set of page tables 115A may be deleted (block 430). For example, the first set of page tables 115A may be destroyed and the hypervisor 180 may create a second set of page tables such that a second set of page tables 115B exist (block 431). In another example, the second set of page tables 115B may have previously been created and/or maintained by the hypervisor 180. The hypervisor 180 may grant the guest 196 a second access to a second data structure 220B in the second set of page tables 115B (blocks 432 and 434). In an example, the hypervisor 180 may grant the component 165 a second access to the second data structure 220B in the second set of page tables 115B. For example, the second set of page tables 115B may include page table data structures. Then, the guest 196 is granted access to the second data structure 220B in the second set of page tables 115B (block 436). For example, the second data structure 220B may be a page table data structure that is used with memory management guest functions. The guest 196 may provide a second guest function 198B at a second guest address range 230B (blocks 438 and 440). For example, the guest 196 may provide a memory management guest function at an address range between guest addresses 175F-J (e.g., x0010 to x0014). The second guest function 198B may be provided at a second guest address range 230B (block 442). As described above, the second guest function 198B may be a memory management guest function. In another example, the second guest function 198B may be a different function that performs other system tasks. The second guest function 198B may be granted access to the second data structure 220B (block 444). For example, a memory management guest function may be granted access to a page table data structure to enable the memory management guest function to manage page tables and page faults for the system. The guest 196 may specify the second guest address range 230B to the hypervisor 180 (blocks 446 and 448). For example, the guest 196 may enlist component 165 to specify the second guest address range 230B to the hypervisor 180. Then, the hypervisor 180 may receive the second guest address range 230B from the component 165 (block 450).

The hypervisor 180 may destroy page tables (block 452) such that the page tables may be deleted (block 454). In an example, the hypervisor 180 may destroy the current set of page tables to create a new set of page tables. For example, the hypervisor 180 may destroy the second set of page tables 115B to create the first set of page tables 115A. In another example, the hypervisor may maintain multiple sets of page tables. Then, hypervisor 180 may create a first set of page tables 115A (blocks 456 and 458) such that the first set of page tables 115A exist (block 460). For example, the hypervisor 180 may create the first set of page tables 115A associated with the first guest function 198A and the first guest address range 230A.

Then, the guest 196 may execute first guest function 198A (block 468). For example, the guest 196 may execute the first address range 230A to perform scheduling tasks. The guest 196 may execute the first guest function 198A within the first set of page tables 115A (block 470). For example, the first set of page tables 115A may include task data structures that are used by a scheduler guest function. The first guest function 198A may pass control to the second guest function 198B (blocks 472 and 474) such that the second guest function 198B has control (block 476). For example, the first guest function 198A may pass control to the second guest function 198B in order to perform other system tasks such as managing memory. Then, the guest 196 may attempt to execute the second guest function 198B (block 478). For example, the guest 196 may attempt to execute the second guest function 198B in the first set of page tables 115A. The second guest function 198B may not be able to execute with the first set of page tables 115A (block 480). For example, the second guest function is loaded at distinct guest addresses and therefore is unable to execute within the first set of page tables 115A, which advantageously improves system security by preventing unauthorized access to memory locations and data structures of the system. Then, the hypervisor 180 may generate an execution page fault (block 482). In an example, the hypervisor 180 may deny access to the restricted page table (e.g., first set of page tables 115A). In another example, the hypervisor 180 may deny access by halting the virtual machine 170A.

The hypervisor 180 may locate a proper page table associated with the second guest function 198B (blocks 484 and 486). For example, the hypervisor 180 may locate the proper set of page tables 115 associated with the second guest function 198B. Accordingly, the second set of page tables 115B are located (block 488). In an example, the second set of page tables 115B may be located by the hypervisor 180 creating the second set of page tables. For example, the hypervisor 180 may destroy the first set of page tables 115A before creating the second set of page tables 115B. In another example, the hypervisor 180 may maintain multiple sets of page tables.

Then, the hypervisor 180 may switch to the second set of page tables 115B (block 490). For example, the hypervisor 180 may switch to the second set of page tables 115B where the second guest function 198B and the second guest address range 230B is executable. The guest 196 may execute the second guest function 198B (block 492). Accordingly, the second guest function 198B is executed by the guest 196 with the second set of page tables 115B (block 494). For example, the guest 196 may execute the second guest function 198B without modifying guest code in order to execute host page table instructions, which advantageously increases security without sacrificing the performance associated with modifying guest code.

Figure 5:
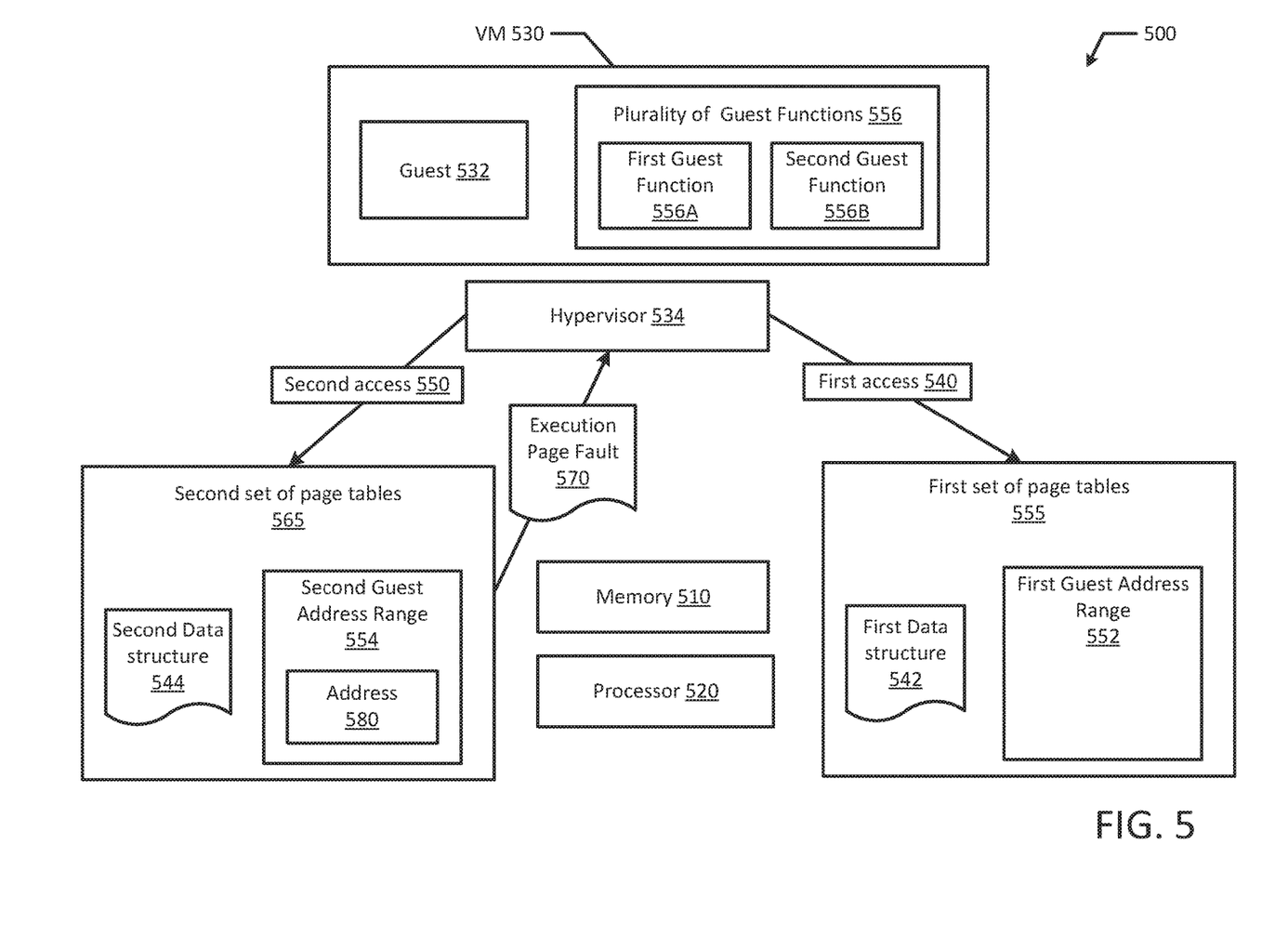
FIG. 5 illustrates a block diagram of an example system capable of addressed based host page table selection according to an example embodiment of the present disclosure.

FIG. 5 is a block diagram of an example system 500 capable of address based host page table selection according to an example embodiment of the present disclosure. The system 500 system includes a memory 510, at least one physical processor 520 in communication with the memory 510, a virtual machine 530, and a hypervisor 534. The virtual machine 530 may includes a guest 532 executing on the at least one physical processor 520. The hypervisor 534 may execute on the at least one physical processor 520 to grant the guest 532 a first access 540 to a first data structure 542 in a first set of page tables 555. A first guest address range 552 may be executable in the first set of page tables 555. The first guest address range 552 may correspond to a first guest function 556A of a plurality of guest functions 556. The first guest function 556A may be associated with the first data structure 542. The hypervisor 534 may also execute on the at least one physical processor 520 to grant the guest 532 a second access 550 to a second data structure 544 in a second set of page tables 565. A second guest address 554 range may be executable in the second set of page tables 565. The second guest address range 554 may correspond to a second guest function 556B of the plurality of guest functions 556. The second guest function 556 may be associated with the second data structure 544. The hypervisor 534 may execute on the at least one physical processor 520 to detect an execution page fault 570 at an address 580 within the second address range 554. The hypervisor 534 may locate the second set of page tables 565, and may switch to the second set of page tables 565.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one physical processor in communication with the memory;
a virtual machine including a guest executing on the at least one physical processor; and
a hypervisor executing on the at least one physical processor to:
grant the guest a first access to a first data structure in a first set of page tables, wherein
a first guest address range is executable in the first set of page tables,
the first guest address range corresponds to a first guest function of a plurality of guest functions, and
the first guest function is associated with the first data structure;

grant the guest a second access to a second data structure in a second set of page tables different than the first set of page tables, wherein
    a second guest address range is executable in the second set of page tables
    the second guest address range corresponds to a second guest function of the plurality of guest functions, and
    the second guest function is associated with the second data structure;
after granting the guest the first access and the second access, detect an execution page fault at an address within the second address range;
responsive to detecting the execution page fault, locate the second set of page tables; and
responsive to locating the second set of page tables, switch to the second set of page tables.

2. The system of claim 1, wherein a first guest code includes the plurality of guest functions.

3. The system of claim 2, wherein the guest provides the first guest function at the first guest address range and the second guest function at the second guest address range.

4. The system of claim 3, further including a second virtual machine and a second guest code including a second plurality of guest functions, the second plurality of guest functions including a third guest function and a fourth guest function.

5. The system of claim 1, wherein the first guest function is a scheduler guest function that includes code for scheduling tasks.

6. The system of claim 5, wherein the first data structures are task data structures.

7. The system of claim 1, wherein the second guest function is a memory management guest function that includes code for managing memory.

8. The system of claim 7, wherein the second data structures are page table data structures.

9. A method comprising:
granting, by a hypervisor, a guest a first access to a first data structure in a first set of page tables, wherein
    a first guest address range is executable in the first set of page tables,
    the first guest address range corresponds to a first guest function of a plurality of guest functions, and
    the first guest function is associated with the first data structure;
granting, by the hypervisor, the guest a second access to a second data structure in a second set of page tables different than the first set of page tables, wherein
    a second guest address range is executable in the second set of page tables,
    the second guest address range corresponds to a second guest function of the plurality of guest functions, and
    the second guest function is associated with the second data structure;
after granting the guest the first access and the second access, detecting, by the hypervisor, an execution page fault at an address within the second address range;
responsive to detecting the execution page fault, locating, by the hypervisor, the second set of page tables; and
responsive to locating the second set of page tables, switching, by the hypervisor, to the second set of page tables.

10. The method of claim 9, further comprising loading, by the hypervisor, a component into a guest during guest initialization, wherein the component specifies a first guest address and a second guest address to the hypervisor.

11. The method of claim 9, wherein granting the first access by the hypervisor includes destroying a first pervious set of page tables, and creating the first set of page tables.

12. The method of claim 9, wherein granting the first access by the hypervisor includes maintaining the first set of page tables.

13. The method of claim 9, wherein switching to the second set of page tables includes jumping to the second guest address.

14. The method of claim 9, wherein locating the second set of page tables includes executing a lookup.

15. The method of claim 9, further comprising:
responsive to the first guest function attempting to access a restricted page table, detecting, by the hypervisor, a fault, wherein the restricted page table is utilized by a main OS; and
denying, by the hypervisor, the first guest address range access to the restricted page table.

16. The method of claim 15, wherein denying access includes halting the virtual machine.

17. The method of claim 9, further comprising:
responsive to the first guest function attempting to access the second set of page tables, denying, by the hypervisor, access to the first guest address range from the second set of tables.

18. A non-transitory machine readable medium storing a program, which when executed by a processor, causes a hypervisor to:
grant a guest a first access to a first data structure in a first set of page tables, wherein
    a first guest address range is executable in the first set of page tables,
    the first guest address range corresponds to a first guest function of a plurality of guest functions, and
    the first guest function is associated with the first data structure;
grant the guest a second access to a second data structure in a second set of page tables different than the first set of page tables, wherein
    a second guest function is executable in the second set of page tables,
    the second guest address range corresponds to a second guest function of the plurality of guest functions, and
    the second guest function is associated with the second data structure;
after granting the guest the first access and the second access, detect an execution page fault at an address within the second address range;
responsive to detecting the execution page fault, locate the second set of page tables; and
responsive to locating the second set of page tables, switch to the second set of page tables.

19. The non-transitory machine readable medium of claim 18, which further causes the hypervisor to deny access to the first guest address range from the second set of page tables.

20. The non-transitory machine readable medium of claim 18, wherein denying access includes halting the virtual machine.

* * * * *